(12) United States Patent
Kato et al.

(10) Patent No.: US 9,442,239 B2
(45) Date of Patent: Sep. 13, 2016

(54) ILLUMINATING DEVICE

(71) Applicant: Kabushiki Kaisha Toshiba, Minato-ku (JP)

(72) Inventors: Mitsuaki Kato, Kanagawa-ken (JP); Hiroshi Ohno, Kanagawa-ken (JP); Katsumi Hisano, Chiba-ken (JP); Masataka Shiratsuchi, Kanagawa-ken (JP); Tomonao Takamatsu, Kanagawa-ken (JP); Tomoyuki Suzuki, Kanagawa-ken (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 41 days.

(21) Appl. No.: 14/203,812

(22) Filed: Mar. 11, 2014

(65) Prior Publication Data
US 2014/0293654 A1 Oct. 2, 2014

(30) Foreign Application Priority Data
Mar. 26, 2013 (JP) ................. 2013-064623

(51) Int. Cl.
F21V 7/04 (2006.01)
F21V 8/00 (2006.01)

(52) U.S. Cl.
CPC ........... G02B 6/0036 (2013.01); G02B 6/0085 (2013.01); G02B 6/0088 (2013.01)

(58) Field of Classification Search
CPC G02B 6/0036; G02B 6/0085; G02B 6/0088; G02B 6/0038; G02B 6/0035; G02B 6/00
USPC ................................ 362/623, 625
See application file for complete search history.

(56) References Cited

U.S. PATENT DOCUMENTS

| | | | |
|---|---|---|---|
| 2010/0027293 A1* | 2/2010 | Li ................. | 362/619 |
| 2010/0091488 A1* | 4/2010 | Ijzerman et al. ........... | 362/235 |
| 2011/0170315 A1* | 7/2011 | Chen ............ | 362/612 |
| 2012/0218768 A1 | 8/2012 | Hisano et al. | |

FOREIGN PATENT DOCUMENTS

| | | |
|---|---|---|
| JP | 2003-249783 | 9/2003 |
| JP | 2004-288570 | 10/2004 |
| JP | 2010-198807 | 9/2010 |

* cited by examiner

Primary Examiner — Y M Lee
(74) Attorney, Agent, or Firm — Oblon, McClelland, Maier & Neustadt, L.L.P

(57) ABSTRACT

In one embodiment, a light emitting device includes: a light source which emits light; a light guide portion which has an emission surface which emits light and a back surface which opposes to the emission surface, and which has at the back surface a reflecting portion which the light emitted from the light source enters and which reflects the entering light toward the emission surface; a heat transfer portion which opposes to the back surface of the light guide portion and is provided with an interval which is a wavelength of the light or more being spaced from the back surface; and a support portion which is provided between the reflecting portion and the heat transfer portion, and which keeps the interval between the light guide portion and the heat transfer portion.

15 Claims, 10 Drawing Sheets

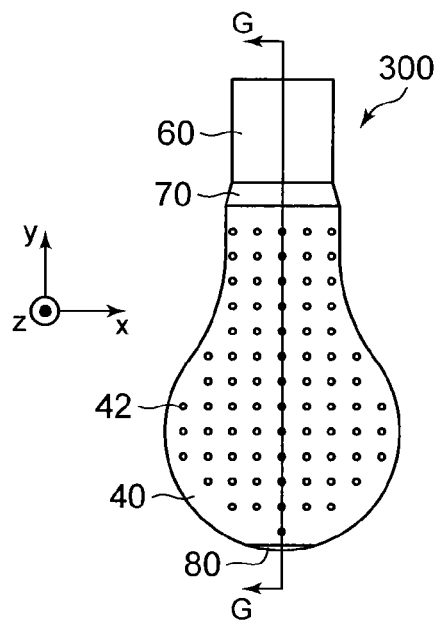
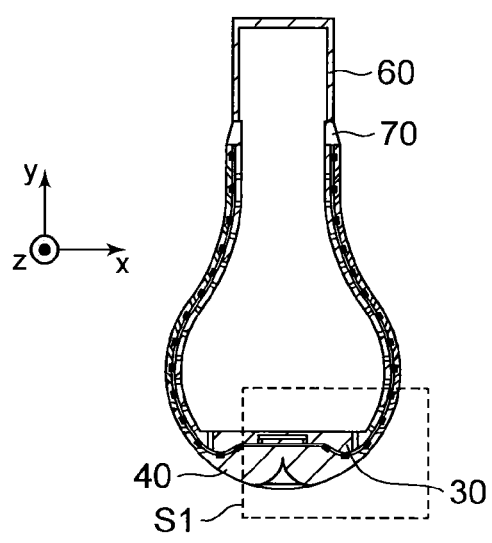
FIG. 8A  FIG. 8B
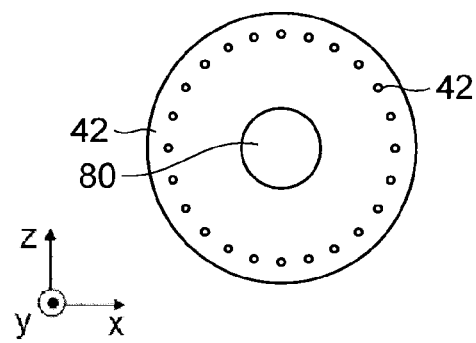
FIG. 8C

ILLUMINATING DEVICE

CROSS-REFERENCE TO RELATED APPLICATION

This application is based upon and claims the benefit of priority from the prior Japanese Patent Application No. 2013-064623, filed on Mar. 26, 2013, the entire contents of which are incorporated herein by reference.

FIELD

Embodiments described herein relate generally to an illuminating device.

BACKGROUND

Some illuminating devices which use LED light sources include light guide members which guide lights from the LED light sources by totally reflecting the lights. The light guide member is a flat plate which has an emission surface, and emits lights to an outside from this emission surface. A rate of all light fluxes emitted from an illuminating device to all light fluxes of light sources is referred to as a light output ratio. Further, the illuminating device includes a heat transfer member which receives heat from LED light sources, and transfers heat to an outside of the device from a surface. In this case, preferably, heat is transferred not only from the surface of the heat transfer member but also from the surface of the light guide member. Then, the heat transfer member is provided in contact with the light guide member to transfer heat to the light guide member. However, it is known that the heat transfer member absorbs part of lights. As a result, the light output ratio of the illuminating device is reduced.

BRIEF DESCRIPTION OF THE DRAWINGS

FIGS. 8A, 8B and 8C are views illustrating an illuminating device according to a third embodiment;

DETAILED DESCRIPTION

Embodiments for carrying out the invention will be described below with reference to the drawings.

First Embodiment

Figure 1A:
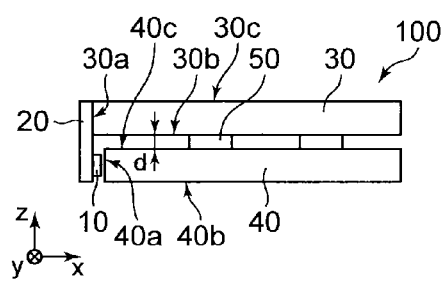
FIGS. 1A, 1B and 1C are cross-sectional views illustrating an illuminating device according to a first embodiment.
Figure 1B:
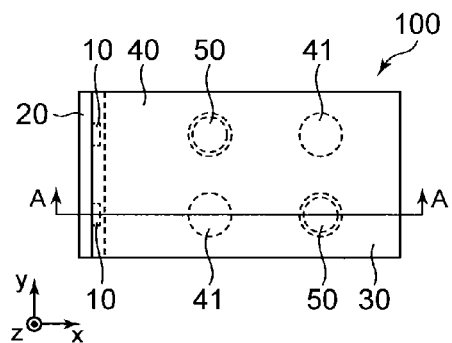
Figure 1C:
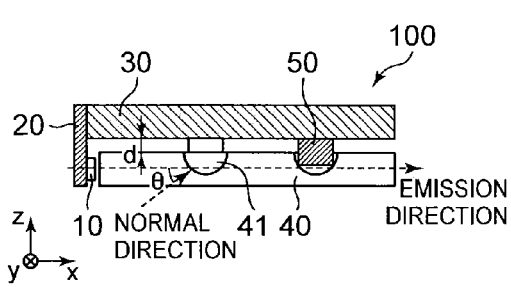

According to a first embodiment, an illuminating device 100 is provided in, for example, a ceiling (xy plane) as, for example, an indoor illumination lamp. In this regard, a direction from an indoor floor to the ceiling is a positive direction of a z axis. FIG. 1A is a view illustrating the illuminating device 100 seen from a y axis direction, FIG. 1B is a view illustrating the illuminating device 100 seen from a negative direction of the z axis, and FIG. 1C is an A-A cross-sectional view of the illuminating device 100 in FIG. 1B.

As illustrated in FIG. 1A, in the illuminating device 100, light sources 10 such as LED light sources are set on a bonding member 20. The light sources 10 are connected to a power source through electric wires which are not illustrated, and emit visible lights which travel toward an x axis direction (a normal direction which is vertical to a light emission surface) by supplying power from the power source. The bonding member 20 transfers heat emitted from the light source 10 to a heat transfer member 30.

A light guide member 40 is a member which is transparent with respect to visible lights and which is thin and planar along the xy plane. A lateral surface 40a of the light guide member 40 is provided such that the lateral surface 40a opposes to light emission surfaces of the light sources 10. The light guide member 40 guides lights entering from the lateral surface 40a in the x axis direction, and emits lights to an outside (the negative direction of the z axis) from an emission surface 40b. In this case, the entire emission surface 40b emits light, and the illuminating device 100 can use this light as illumination light.

The heat transfer member 30 is a member which is bonded to the bonding member 20, which is thin and planar along the xy plane similar to the light guide member 40 and which has high thermal conductivity. Support members 50 are provided to keep a nearly fixed interval d between the heat transfer member 30 and the light guide member 40. The heat transfer member 30 transfers heat received from the bonding member 20, from a surface 30c. Part of heat is transferred to the light guide member 40 through the support members 50, and is also transferred from the emission surface 40b of the light guide member.

As illustrated in FIG. 1B, the light sources 10 are one or a plurality of light sources to be mounted in the y axis direction, and emits visible lights such as white lights in the x axis direction (emission direction). For example, when a light emitting element which produces blue light of a wavelength of 450 nm is used, the light source 10 produces white light by sealing the light emitting element by a resin material or the like which includes a fluorescent material which absorbs the blue light and produces yellow light of a wavelength of about 560 nm. The light source 10 is preferably provided on the surface of the bonding member 20 to contact the bonding member 20 through a sheet, an adhesive tape, an adhesive or a thermal grease (not illustrated) excellent in thermal conductivity. This is because less contact thermal resistance between the light sources 10 and the bonding member 20 is preferable to transfer heat transferred from the light sources 10 to the bonding member 20. In addition, for example, metal including aluminum, copper and iron can be used for the bonding member 20. The bonding member 20 is preferably a member which has at least higher thermal conductivity than thermal conductivity of the light guide member 40, and resin or glass of high thermal resistance can also be used for the bonding member 20. The light sources 10 are desirably provided on the surface of the bonding member 20 to contact the bonding member 20 through a material (such as an insulation sheet) which has an electric insulation property when the light sources 10 need to be electrically insulated.

The light guide member 40 guides (propagates) lights in the x axis direction by totally reflecting the lights entering from the lateral surface 40a between the back surface 40c and the emission surface 40b. For example, PMMA, (refractivity n≈1.5) polycarbonate or cycloolefin polymer or glass can be used for the light guide member 40. The back surface 40c of the light guide member 40 includes (four in FIG. 1B) reflecting portions (concave portions) 41 at a plurality of positions along the xy plane. The concave portions 41 reflect part of lights which propagate through the light guide member 40, toward the emission surface 40b to emit the lights from the emission surface 40b. The concave portion 41 has, for example, a spherical crown shape. Further, an angle θ formed between a direction in which the light guide member 40 guides lights and a normal direction of a lateral surface of the spherical crown is greater than a total reflection angle θc expressed by the following equation such that lights entering the concave portions 41 satisfy a total reflection condition. Meanwhile, the direction in which lights are guided is a direction along a line connecting centers of the back surface 40c and the emission surface 40b of the light guide member 40 in a cross section of the light guide member 40 cut in the xz plane. In the present embodiment, the direction in which lights are guided matches an emission direction. By this means, it is possible to totally reflect lights toward the emission surface 40b, and reduce loss of light caused when diffused lights travel toward the heat transfer member 30. In addition, in the following equation, n is a refractive index of the light guide member 40, and $n_{air}$ is a refractive index of air (for example, 1).

$$\sin \theta c = n_{air}/n \quad (1)$$

In addition, the concave portions 41 may be provided by monotonically increasing the density (the number of concave portions 41 per unit area) apart from the light sources 10 to compensate for the light amount which decreases apart from the light sources 10. Further, an interval which prevents contact caused by thermal expansion of the light guide member 40 is desirably provided between the light sources 10 and the light guide member 40.

As illustrated in FIG. 1C, a gap which is an interval d is provided by the support members 50 between the surface 30b of the heat transfer member 30 and the back surface 40c of the light guide member 40. This gap is, for example, an air layer. The support members 50 are, for example, columnar members which are provided between at least part of the concave portions 41 of a plurality of concave portions 41 and the heat transfer member 30.

Figure 2:
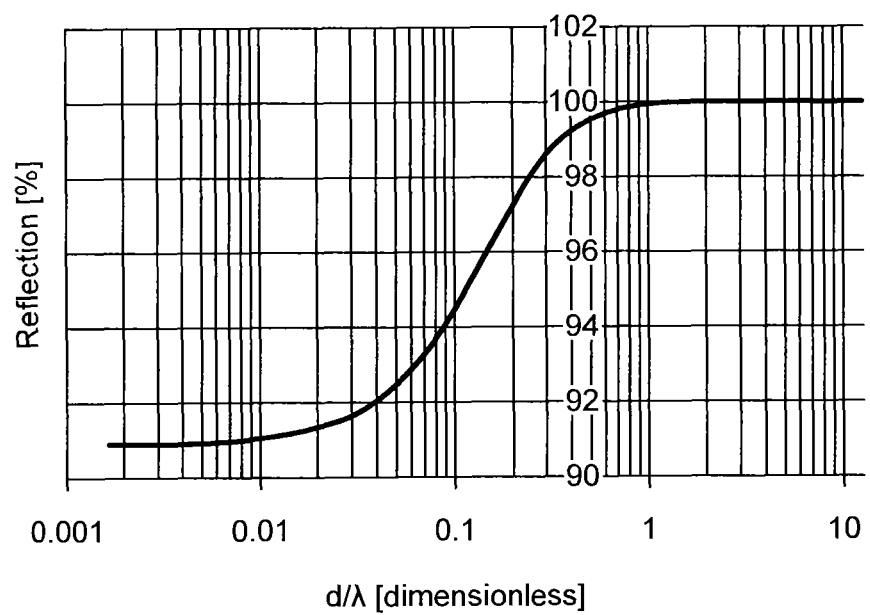
FIG. 2 is a view illustrating an example of optical calculation according to the first embodiment.

Meanwhile, the interval d is set larger than a wavelength λ of lights emitted from the light sources 10. Further, simultaneously, the interval d is preferably set to about 0.01 to 1.0 mm such that the interval d is small in an allowable range of precision to machine, for example, the concave portions 41 and the support members 50 to make it easy to transfer heat from the heat transfer member 30 to the light guide member 40 as described below. FIG. 2 is a view illustrating a relationship between d/λ and a reflection when the light guide member 40 is made of acrylic, the heat transfer member 30 is made of aluminum and total reflection is caused at an incident angle 45 degrees in the light guide member 40. FIG. 2 shows that, while the reflection is close to 100% in case of d/λ>1, that is, in case of d>λ, lights are absorbed by the heat transfer member 30 in case of d/λ<1, that is, in case of d<λ, and the reflection is reduced as the reflection becomes close to d=0. Consequently, it is possible to set the reflection of lights which are guided in the light guide member 40, close to 100% by providing a gap of the interval d that is set longer than a wavelength λ and shorter than 1.0 mm, between the surface 30b of the heat transfer member 30 and the back surface 40c of the light guide member 40 in the illuminating device 100 in FIGS. 1A, 1B and 1C. That is, it is possible to extract most of lights from the emission surface 40b which are guided in the light guide member 40 as illumination lights, and reduce loss of lights caused when the heat transfer member 30 absorbs lights. This means that it is possible to prevent lights from being propagated to the heat transfer member 30 due to an evanescent wave, and thereby reduce loss.

The lateral surface 30a of the heat transfer member 30 is in contact with the bonding member 20. In this case, heat from the light sources 10 only needs to be transferred to the heat transfer member 30, and another member may also be interposed to place the heat transfer member 30 and the bonding member 20 in direct contact and, in addition, to bond the heat transfer member 30 and the bonding member 20. For example, the heat transfer member 30 and the bonding member 20 can be bonded by a thermal grease, an adhesive tape, an adhesive or a screw of good thermal conductivity. Consequently, it is possible to transfer heat from the light sources 10 to the heat transfer member 30 through the bonding member 20. For example, metal including aluminum, copper and iron, resin, ceramics or glass can be used for the heat transfer member 30.

The support members 50 are in contact with the surface 30b of the heat transfer member 30 and are in linear contact with part of lateral surfaces of the concave portions 41 to keep the fixed interval d between the heat transfer member 30 and the light guide member 40. By providing the support members 50 in the illuminating device 100 in FIGS. 1A, 1B and 1C in this way, it is possible to prevent the heat transfer member 30 and the light guide member 40 from contacting each other due to an influence of thermal expansion or deflection even when the gap between the heat transfer member 30 and the light guide member 40 is small. Further, the support members 50 are in contact with part of the lateral surfaces of the concave portions 41, so that it is possible to reduce a contact area of the support members 50 and the light guide member 40 as much as possible. Consequently, it is possible to reduce loss of lights caused when the lights are absorbed by the heat transfer member 30, and improve a light output ratio of the illuminating device 100 (a rate of all light fluxes to be emitted from the illuminating device to all light fluxes of light sources).

Metal including aluminum, copper and iron, resin, ceramics or glass can be used for the support members 50. The members having thermal conductivity are used in this way, so that it is possible to increase equivalent thermal conductivities between the heat transfer member 30 and the light guide member 40 and in the concave portions 41 and make it easy to transfer heat from the heat transfer member 30 to the light guide member 40. In addition, the equivalent thermal conductivity is expressed as $(Aa \times ka + As \times ks)/(Aa + As)$ when the thermal conductivity of an air layer is ka, the thermal conductivity of the support member 50 is ks, a cross section area of the air layer vertical to the z axis is Aa and a cross section area of the support member 50 is As.

Further, members having thermal conductivity are used for the support members 50, so that it is possible to increase the volumes of the support members 50 when the support members 50 are provided between the heat transfer member 30 and the concave portions 41 and even when the contact areas are fixed compared to the volumes of the support members 50 when, for example, the support members 50 are provided between the heat transfer member 30 and the back surface 40c of the light guide member 40. Consequently, it is possible to increase the equivalent thermal conductivity of the gap (including the air layer and the support members 50) between the light guide member 40 including the concave portions 41 and the heat transfer member 30, and make it easy to transfer heat from the heat transfer member 30 to the light guide member 40.

In addition, the support members 50 can also be provided as members integrated with the heat transfer member 30. Further, the bonding member 20 can also be provided as a member integrated with the heat transfer member 30.

Meanwhile, when, for example, thermal resistance of the light guide member 40 is $R_g$, thermal resistance $R_{cg}$ between the heat transfer member 30 and the light guide member 40 is $R_{cg} \leq R_g$. In this case, when the thickness of the light guide member 40 is l=1.5 mm and the surface area is A=0.01 m² and is made of polycarbonate, acrylic or cycloolefin polymer ($k_g \approx 0.2$ W/mK), the thermal resistance $R_g$ is about 0.75 K/W. Further, when the thermal conductivity of the air layer is $k_{air} \approx 0.03$ W/mK, a material of the support members 50 is aluminum ($k_c \approx 120$ W/mK), an occupation ratio of the support members 50 between the heat transfer member 30 and the light guide member 40 is 0.1%, and an occupation ratio of the air layer is 99.9%, a thickness $d_{cg}$ corresponding to the thermal resistance $R_{cg}$ of 0.75 K/W is about 1.2 mm.

A function of the illuminating device 100 will be described in detail below.

When, for example, power is supplied to the light sources 10 from, for example, a power source in a room, the light sources 10 emit lights.

The lights emitted from the light sources 10 enter the light guide member 40 from the lateral surface 40a of the light guide member 40. Lights of these lights which satisfy the total reflection condition (reflection angle θ>critical angle θc) are guided (propagate) by being repeatedly totally reflected between the light guide member 40 and the air layer.

Part of the lights which are guided in the light guide member 40 are reflected in a direction of the emission surface 40b by the concave portions 41 and then are emitted to an outside of the light guide member 40 from the emission surface 40b without being totally reflected in the light guide member 40. Consequently, the emission surface 40b of the light guide member 40 emits lights and the illuminating device 100 functions as an illumination lamp.

Further, the light sources 10 generate heat following light emission from light emitting elements. This heat is transferred from the light sources 10 to the bonding member 20, and is uniformly transferred in the bonding member 20. Further, heat is transferred from the bonding member 20 to the heat transfer member 30 and is uniformly transferred in the heat transfer member 30. Part of the heat transferred in the heat transfer member 30 is transferred to an outside from the surface 30c of the heat transfer member 30 by way of convection and transfer. Further, the thermal conductivity of the gap between the heat transfer member 30 and the light guide member 40 is increased by providing the support members 50 in the illuminating device 100 in FIG. 1, so that heat is transferred from the heat transfer member 30 to the light guide member 40. Furthermore, heat is transferred to an outside from the emission surface 40b of the light guide member 40 by way of convection and transfer. Consequently, heat is transferred to an outside from both of the heat transfer member 30 and the light guide member 40, so that it is possible to improve transfer performance of the illuminating device 100.

By opening a slight gap between the heat transfer member 30 and the light guide member 40 and providing the support members 50 between the heat transfer member 30 and the concave portions 41 in the illuminating device 100 according the present embodiment as described above, it is possible to increase the light output ratio of the illuminating device 100 and improve transfer performance.

In addition, a transparent resin or the like which has flexibility may be sandwiched between the light sources 10 and the light guide member 40. Consequently, it is possible to reduce, for example, the thermal resistance between the light sources 10 and the light guide member 40, and directly transfer heat from the light sources 10 to the light guide member 40.

Further, the inclination angles θ of the concave portions 41 may become close to the critical angle θc apart from the light sources 10, and the densities or the diameters of the concave portions 41 may increase toward the light sources 10. Consequently, it is possible to diffuse in the light guide member 40 the lights in the vicinity of the light sources 10, and reduce glares in the vicinity of the light sources 10.

Further, the light guide member 40 may include scatters inside. In this case, it is possible to make a brightness distribution in the emission surface 40b more uniform. Further, scattering marks (such as white dots or blast processing) may also be provided to the back surface 40c of the light guide member 40. In this case, it is possible to improve flexibility of the brightness distribution in the emission surface 40b of the light guide member 40 by combining the concave portions 41 and the light guide member 40.

Further, although an example where the heat transfer member 30 covers the entire surface of the light guide member 40 has been described, a configuration where the heat transfer member 30 covers part of the light guide member 40 may be employed. In this case, it is possible to transfer heat from the surface 30c of the heat transfer member 30 and the emission surface 40b of the light guide member 40 and directly transfer heat from the surface 30b of the heat transfer member 30.

Further, although an example where heat is transferred from the heat transfer member 30 has been described, heat of the heat transfer member 30 may be insulated. In this case, it is possible to transfer heat from the emission surface 40b of the light guide member 40.

Further, a coating of a high reflection may be applied to the surface 30b of the heat transfer member 30. In this case, it is possible to suppress absorption of lights on a metal surface.

Further, a sheet of a high reflection may be pasted on the surface 30b of the heat transfer member 30. In this case, it is possible to suppress absorption of lights on the metal surface.

Further, the reflecting portion 41 may be, for example, a scattering pattern such as white ink. In this case, by placing the support members 50 in contact with part of a white ink region, it is possible to keep a fixed interval between the heat transfer member 30 and the light guide member 40.

Modification of First Embodiment

Figure 3A:
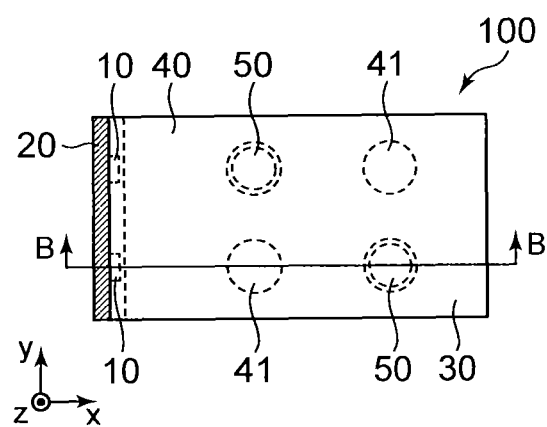
FIGS. 3A and 3B are views illustrating support members according to a first modification of the first embodiment.
Figure 3B:
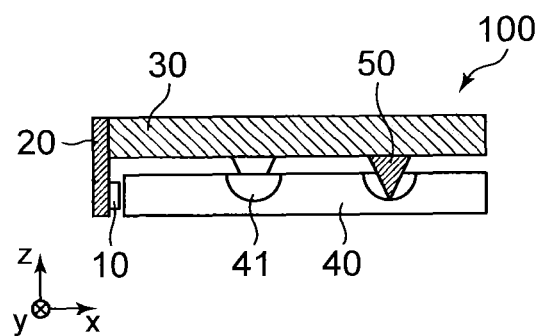

FIG. 3A is a view illustrating an illuminating device 100 according to a first modification seen from a negative direction of the z axis, and FIG. 3B is a B-B cross-sectional view of the illuminating device 100 in FIG. 3A. Support members 50 illustrated in FIGS. 3A and 3B are conical members. The apex of the cone of the support member 50 is in contact with part of a lateral surface (a lowermost portion in the z axis direction) of a concave portion 41. The support members 50 are in point contact with the lateral surfaces of the concave portions 41 in this way, so that it is possible to reduce contact areas between the support members 50 and light guide member 40 compared to the support members 50 which are illustrated in FIGS. 1A, 1B, and 1C and which are in linear contact with the concave portions. Consequently, it is possible to reduce loss of lights caused when a heat transfer member 30 absorbs the lights, and further increase the light output ratio of the illuminating device 100.

Figure 4A:
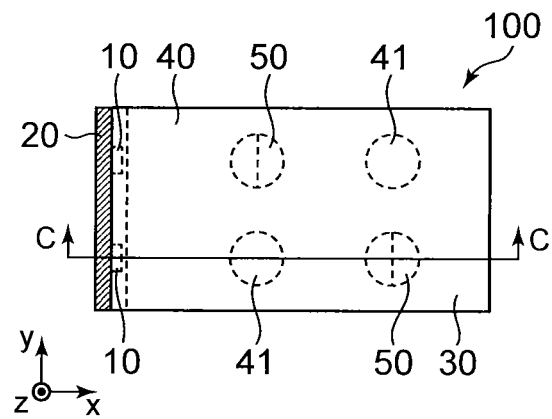
FIGS. 4A and 4B are views illustrating support members according to a second modification of the first embodiment.
Figure 4B:
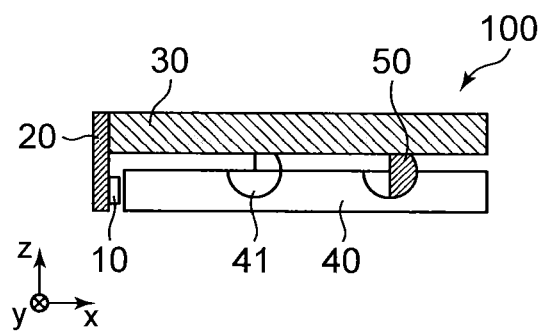

Further, FIG. 4A is a view illustrating an illuminating device 100 according to a second modification seen from a negative direction of the z axis, and FIG. 4B is a C-C cross-sectional view of the illuminating device 100 in FIG. 4A. Meanwhile, when a concave portion 41 is divided in a plane which passes the center in an xy plane of the concave portion 41 and which is vertical to an emission direction, a side closer to a light source 10 is a front surface and a farther side is a rear surface. Support members 50 illustrated in FIGS. 4A and 4B are members which are not in contact with the front surface and are in contact with the rear surface. Consequently, it is possible to increase a filling rate of the support members 50 in the concave portions 41 (the volumes of portions of the support members 50 included in the concave portions 41/the volumes of the concave portions 41), and improve equivalent thermal conductivity of a gap between a heat transfer member 30 and a light guide member 40. Further, the support member 50 is in planar contact with the rear surface of the lateral surfaces of the concave portion 41, so that it is possible to increase the amount of heat to be transferred from the support member 50 to the light guide member 40. As a result, it is possible to improve transfer performance of the illuminating device 100.

In addition, the support members 50 are not in contact with the front surfaces of the concave portions 41, so that it is possible to reduce loss of lights caused when the lights entering the front surfaces of the concave portions 41 absorb the lights, and increase the light output ratio of the illuminating device 100.

Second Embodiment

Hereinafter, further embodiments will be described with reference to the drawings. In the drawings, the same reference numerals denote the same or similar portions respectively.

Figure 5A:
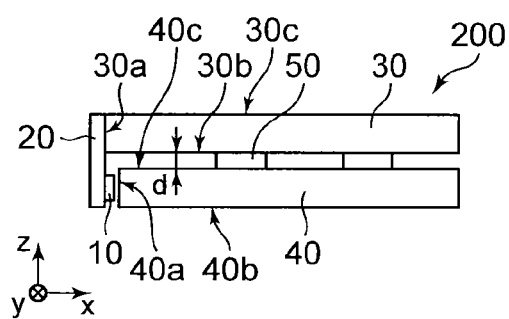
FIGS. 5A, 5B and 5C are views illustrating an illuminating device according to a second embodiment.
Figure 5B:
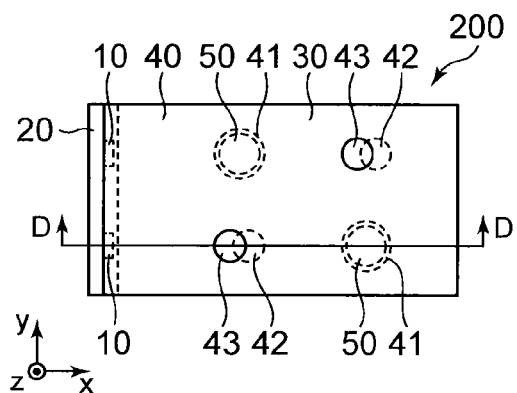
Figure 5C:
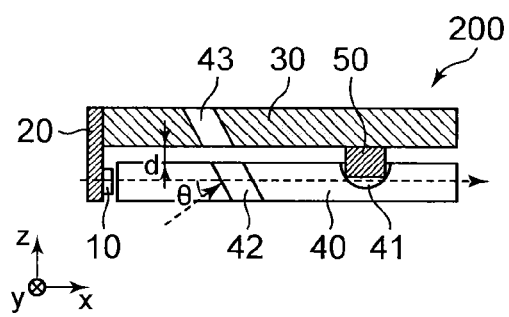

FIGS. 5A, 5B and 5C are views illustrating an illuminating device 200 according to a second embodiment. FIG. 5A is a view illustrating the illuminating device 200 seen from a y axis direction, FIG. 5B is a view illustrating the illuminating device 200 seen from a negative direction of the z axis and FIG. 5C is a D-D cross-sectional view of the illuminating device 200 in FIG. 5B.

The illuminating device 200 differs from an illuminating device 100 according to the first embodiment in including through-holes 42 which penetrate a light guide member 40 and through-holes 43 which penetrate a heat transfer member 30. In addition, the same components as those of the illuminating device 100 according to the first embodiment will be assigned the same reference numerals, and will not be described.

The through-holes 42 are provided to penetrate the light guide member 40 from an emission surface 40b to a back surface 40c. Further, the through-holes 43 are provided to penetrate the heat transfer member 30 from a surface 30b to a surface 30c. The through-holes 42 and the through-holes 43 have oblique columnar shapes in which an angle (inclination angle) θ formed between a direction vertical to a center axis (a normal direction of a lateral surface) and an emission direction is greater than a critical angle θc. In the example illustrated in FIGS. 5A, 5B and 5C, center axes of the through-holes 42 and the through-holes 43 match.

Thus, in the illuminating device 200 in FIGS. 5A, 5B and 5C, the through-holes 42 and the through-holes 43 are provided by matching the center axes, and air circulates in the through-holes 42 and the through-holes 43. Consequently, heat is transferred not only from the surface 30c of the heat transfer member 30 and the emission surface 40b of the light guide member 40 but also from inner surfaces of the through-holes 42 and the through-holes 43, so that it is possible to further improve transfer performance of the illuminating device 200. In addition, by adequately shifting the center axes of the through-holes 42 and the through-holes 43 and preventing development of thermal boundary layers inside holes, it is also possible to further improve transfer performance. Further, when the heat transfer member 30 forms a closed space like an illumination lamp such as an electric bulb, the through-holes 42 cause air circulation in the closed space, so that it is possible to encourage heat transfer from the heat transfer member 30 which faces the closed space. When, for example, the heat transfer member 30 and the light guide member 40 do not form the closed space and are flat plates, temperatures of the heat transfer member 30 and the light guide member 40 are uniformly distributed and are 60 to 150 degrees, the through-holes 42 and the through-holes 43 have columnar shapes, the center axes of the through-holes 42 and the through-holes 43 mutually match, and further match a gravitational force direction, horizontal equivalent diameters $d_m$ of the through-holes 42 and the through-holes 43 are equal, the thermal resistance of inner walls of the through-holes 42 and the through-holes 43 and air circulating in the holes is R, the thermal resistance in the entire hole per unit area is about $R \times d_m^2$ when the hole is filled and an environmental temperature is 0 to 40 degrees, and, when the sum of thicknesses of the heat transfer member 30 and the light guide member 40 is 1 mm, a horizontal equivalent diameter which minimizes the thermal resistance $R \times d_m^2$ is about 2 to 4 mm, and, when the sum of the thicknesses is 20 mm, the horizontal equivalent diameter which minimizes the thermal resistance $R \times d_m^2$ is about 5 to 8 mm. Hence, when the light guide member 40 and the heat transfer member 30 are flat plates, and the sum of the thicknesses of the light guide member 40 and the heat transfer member 30 is 20 mm or less, hole diameters are desirably greater than a wavelength λ of light and 10 mm or less. In addition, the horizontal equivalent diameter $d_m$ is expressed as $4 A_m/s_m$ when a perimeter of the through-hole is $s_m$ and a cross section area is $A_m$.

Further, most of lights entering the through-holes 42 satisfy the total reflection condition, so that it is possible to reflect most of the lights toward the emission surface 40b and reduce loss of lights caused when the reflected lights travel toward the heat transfer member 30.

Figure 6A:
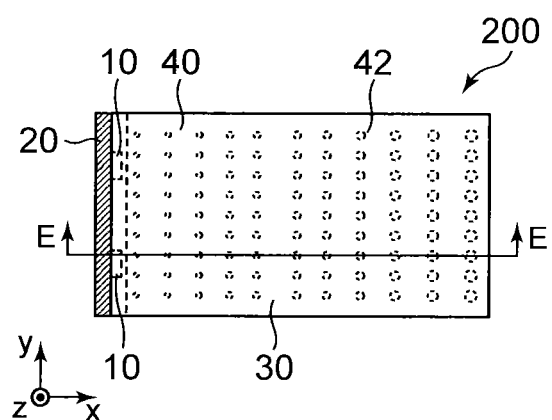
FIG. 6 is a view illustrating through-holes according to the second embodiment.
Figure 6B:
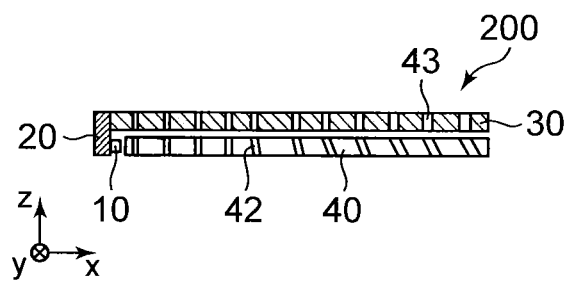

As illustrated in FIG. 6, apart from light sources 10, the inclination angles of the through-holes 42 may become close to the critical angle, and the densities or the diameters of the through-holes 42 and the through-holes 43 may increase. In this case, it is possible to compensate for the light amount which decreases apart from the light sources 10, and make the brightness distribution in the emission surface 40b of the light guide member 40 uniform. Further, it is possible to diffuse in a light guide member the lights in the vicinity of the light sources 10, and reduce glares in the vicinity of the light sources 10.

Modification of Second Embodiment

Figure 7A:
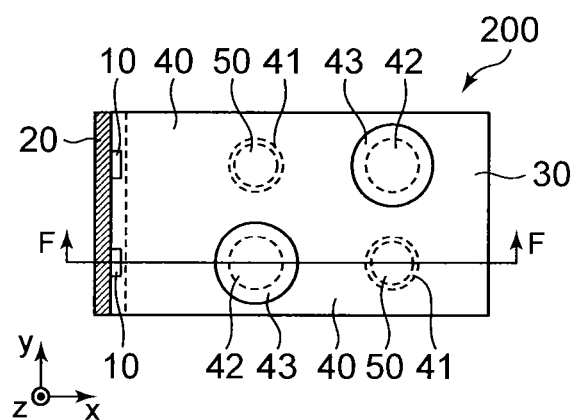
FIGS. 7A and 7B are views illustrating through-holes according to a modification of the second embodiment.
Figure 7B:
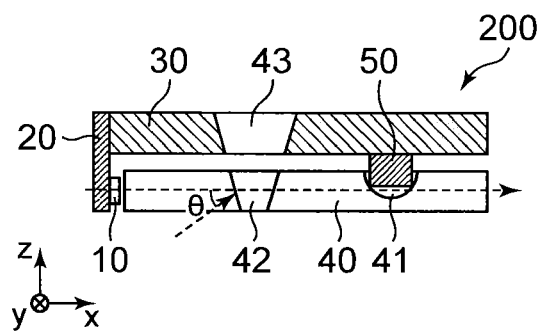

FIG. 7A is a view illustrating an illuminating device 200 according to a modification seen from a negative direction of the z axis, and FIG. 7B is an F-F cross-sectional view of the illuminating device 200 in FIG. 7A. Through-holes 42 and through-holes 43 illustrated in FIGS. 7A and 7B have truncated conical shapes in which an angle θ formed between a direction vertical to a center axis (a normal direction of a lateral surface) and an emission direction is greater than a critical angle θc. Consequently, by tapering an emission surface 40b of a light guide member 40, manufacturing using a mold becomes easy.

In addition, an angle (inclination angle) formed between a direction vertical to a center axis (a normal direction of a lateral surface) and an emission direction may differ between the through-holes 42 and the through-holes 43. By, for example, setting the inclination angles of the through-holes 42 to angles which satisfy the total reflection angle and setting the inclination angles of the through-holes 43 to 90 degrees, that is, forming the through-holes 43 in columnar shapes, manufacturing the through-holes 43 becomes easy. Further, cross sections of the through-holes may not be circular. When, for example, the cross sections are elliptical, it is possible to more intentionally control a direction to emit lights.

Third Embodiment

Figure 9:
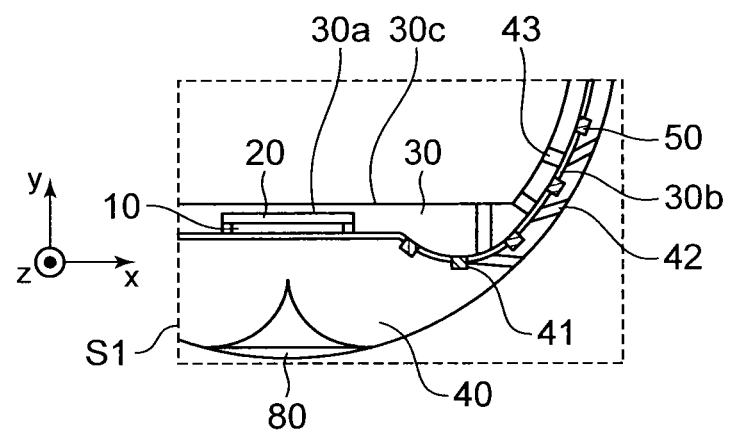
FIG. 9 is a view illustrating an illuminating device according to the third embodiment.

FIGS. 8A, 8B, 8C and 9 are views illustrating an illuminating device 300 according to a third embodiment. In addition, FIG. 8A is an outer shape view of the illuminating device 300, FIG. 8B is a G-G cross-sectional view of the illuminating device 300 cut in a plane which passes on an axis (G-G line) in FIG. 8A and FIG. 8C is a bird view of the illuminating device 300 seen from a y direction of an arrow in FIG. 8A. Further, FIG. 9 is an enlarged view of a region (S1) encircled by a broken line in FIG. 8B. A case will be assumed with the present embodiment where the illuminating device 300 is attached to a socket provided in, for example, a ceiling in a room. The illuminating device 300 in FIG. 8A includes alight guide member 40 which emits light from a surface when the illuminating device 300 functions as an illumination lamp, and a cap portion 60 which functions as an electric and mechanical connection portion when the illuminating device 300 is fixed to the socket which is not illustrated by way of, for example, screwing. In addition, in the present embodiment, the illuminating device 300 has a symmetrical shape with respect to the axis (G-G line). Hereinafter, the axis (G-G line) is referred to as a center axis of the illuminating device 300.

As illustrated in FIG. 8A, in a state where the illuminating device 300 is attached to the socket such that the center axis direction of the illuminating device 300 and the gravitational force direction match, the cap portion 60 of the illuminating device 300 is positioned on an upper side and the light guide member 40 and a light source 10 are positioned on a lower side. When power is supplied to the socket from, for example, a power source in a room, light is emitted from the surface of the light guide member 40 and the illuminating device 300 functions as an illumination lamp.

As illustrated in FIG. 8B, the illuminating device 300 includes a hollow heat transfer member 30, the light guide member 40 which is provided along the shape of the heat transfer member 30 to cover the heat transfer member 30 across an air layer, a light source 10 which is provided partially between the heat transfer member 30 and the light guide member 40, a bonding member 20 which connects the heat transfer member 30 and the light source 10 and a cover 80 which is provided to oppose to the light source 10 across the light guide member 40. In addition, the illuminating device 300 includes a power source circuit which is not illustrated.

Further, as illustrated in FIG. 9, the illuminating device 300 includes reflecting portions (concave portions) 41 which are provided in the back surface of the light guide member 40, a resin ring 70 which connects the heat transfer member 30 and the cap portion 60, support members 50 which are provided partially between the heat transfer member 30 and the light guide member 40, holes (first through-holes) 42 which penetrate the light guide member 40 and holes (second through-holes) 43 which penetrate the heat transfer member 30.

The reflecting portion (concave portion) 41 has, for example, a spherical crown shape. Further, an angle θ formed between a direction in which the light guide member 40 guides light and a normal direction of the lateral surface of the spherical crown is greater than a total reflection angle θc such that lights entering the concave portions 41 satisfy the total reflection condition. Meanwhile, the direction in which lights are guided is a direction along a line connecting centers of a back surface 40c and an emission surface 40b of the light guide member 40 in a cross section of the light guide member 40 cut in the xy plane. In the present embodiment, this direction matches a tangent direction at the apex of the spherical crown.

When power is supplied to the socket from, for example, a power source in a room in a state where the cap portion 60 of the illuminating device 300 is attached to the socket provided in, for example, a ceiling in the room, an alternating-current voltage is supplied to a power source circuit which is not illustrated through the cap portion 60. Further, a constant current is supplied to the light source 10 through the power source circuit. By this means, the light source 10 emits light.

The light emitted from the light source 10 enters the light guide member 90 provided at a position opposing to the light source 10. The light which satisfies the total reflection condition (reflection angle θ>critical angle θm) in interfaces of air layers between the light guide member 40 and an external space and between the heat transfer member 30 and the light guide member 40 is guided (propagates) in the light guide member 40 by being repeatedly totally reflected in the interface between the light guide member 40 and the external space and the interface between the light guide member 40 and the air layer.

Lights which are diffused by the concave portions 41 and the through-holes 42 provided in the light guide member and which do not satisfy the above total refection condition are emitted to the external space from the light guide member 40 without being totally reflected in the interface between the light guide member 40 and the external space. By this means, the lights are emitted from the surface of the light guide member 40.

In this case, the light source 10 generates heat following light emission from a light emitting element. This heat is transferred from the light source 10 to the heat transfer member 30 through the bonding member 20. Further, heat is transferred in the heat transfer member 30. Next, heat is transferred from the heat transfer member 30 to the light guide member 40 through the support members 50, the concave portions 41 and other air layers. In this case, the support members 50 are provided between the heat transfer member 30 and the light guide member 40 as described above, so that it is possible to efficiently transfer heat. Further, heat is also transferred through the through-holes 43 of the heat transfer member 30 and the through-holes 42 of the light guide member 40. Further, outdoor air is injected in the closed space formed by the heat transfer member 30 through the through-holes 42 and the through-holes 43, so that heat is also transferred from a heat transfer member inner surface 30c.

Modification of Third Embodiment

Figure 10A:
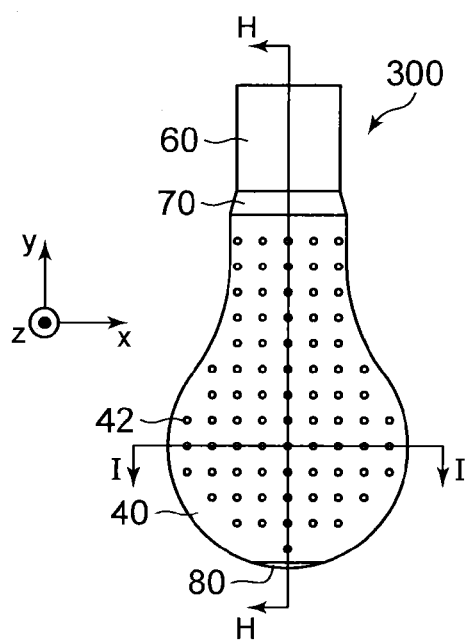
FIGS. 10A, 10B and 10C are views illustrating an illuminating device according to a modification of the third embodiment.
Figure 10B:
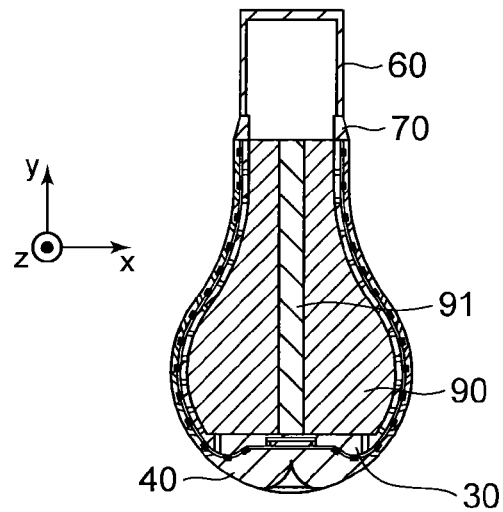
Figure 10C:
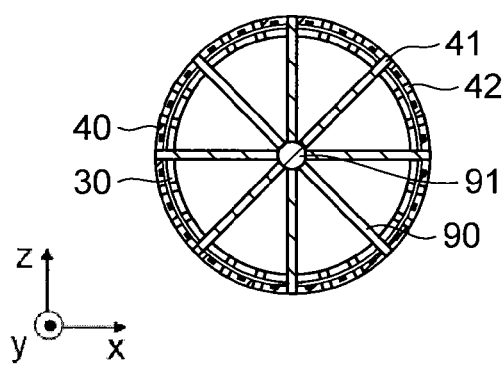

FIG. 10A is a view illustrating an illuminating device 300 according to a modification, FIG. 10B is an H-H cross-sectional view of the illuminating device 300 in FIG. 10A and FIG. 10C is an I-I cross-sectional view of the illuminating device 300 in FIG. 10A. A fin 90 and a support column 91 illustrated in FIGS. 10B and 10C are thermally connected with a heat transfer member 30. Thus, by arranging the fin 90 and the support column 91 inside the heat transfer member 30, the outdoor air which flows in through-holes 42 and through-holes 43 transfers heat not only from the through-holes 42, the through-holes 43 and a heat transfer member inner surface 30c but also from the fin 90 and the support column 91. For example, metal including aluminum, copper and iron can be used for the fin 90, and, for example, metal including aluminum, copper and iron or a heat pipe can be used for the support column 91. The fin 90 and the support column 91 are preferably members which have higher thermal conductivities than at least thermal conductivity of the light guide member 40, and resin or glass of high thermal resistance can also be used for the fin 90 and the support column 91.

In addition, although an example has been described with the present embodiment where the light source 10 is positioned at a front end of the illuminating device 300, the light source 10 may be provided at another position such as the vicinity of a cap. Further, although the example with one light source 10 has been described, a plurality of light sources 10 may be provided. Further, although an example of a lamp having the same shape as that of a general incandescent electric lamp has been described, the present invention is applicable to various lamps such as ball lamps, straight tube fluorescent lamps, ceiling lights and downlights.

The illuminating device according to at least one of the embodiments described above can improve the light output ratio of the illuminating device 100 and improve transfer performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A light emitting device comprising:
a light source which emits light;
a light guide portion which has an emission surface which emits light and a back surface which opposes to the emission surface, and which has at the back surface a reflecting portion which the light emitted from the light source enters and which reflects the light toward the emission surface;
a heat transfer portion which opposes to the back surface of the light guide portion and is provided with an air layer which is a wavelength of the light or more being spaced from the back surface; and
a support portion which is provided between the reflecting portion and the heat transfer portion, and which keeps the air layer between the light guide portion and the heat transfer portion.

2. The light emitting device according to claim 1, further comprising a plurality of reflecting portions,
wherein a number of the reflecting portions per unit area in the back surface of the light guide portion increases apart from the light source.

3. The light emitting device according to claim 1, further comprising a bonding portion on which the light source is set, which connects the heat transfer portion and which has higher thermal conductivity than thermal conductivity of the light guide portion.

4. The light emitting device according to claim 1, further comprising a through-hole which penetrates the heat transfer portion.

5. A light emitting device comprising:
a light source which emits light;
a light guide portion which has an emission surface which emits light and a back surface which opposes to the emission surface, and which has at the back surface a reflecting portion which has a concave portion and the light emitted from the light source enters and which reflects the light toward the emission surface;
a heat transfer portion which opposes to the back surface of the light guide portion and is provided with an interval which is a wavelength of the light or more being spaced from the back surface; and
a support portion which is in contact with part of the concave portion and is provided between the reflecting portion and the heat transfer portion, and which keeps the interval between the light guide portion and the heat transfer portion.

6. The light emitting device according to claim 5, wherein the light guide portion guides the light between the emission surface and the back surface, and
an angle formed between a direction in which the light guide portion guides the light and a normal direction which is vertical to a lateral surface of the concave portion is greater than a critical angle of total reflection.

7. The light emitting device according to claim 5, further comprising a first through-hole which penetrates the light guide portion,
wherein an angle formed between a direction in which the light guide portion guides the light and a normal direction which is vertical to a lateral surface of the first through-hole is greater than a critical angle of total reflection.

8. The light emitting device according to claim 5, further comprising a plurality of first through-holes,
wherein, apart from the light source, an angle formed between a direction in which the light guide portion guides the light and a normal direction which is vertical to a lateral surface of the first through-hole becomes close to a critical angle of total reflection and a number of the first through-holes per unit area increases.

9. A light bulb comprising:

a light source which emits light;

a light guide portion which has a concave portion and an emission surface which emits light and a back surface which opposes to the emission surface, and which has at the back surface a reflecting portion which the light emitted from the light source enters and which reflects the light toward the emission surface;

a heat transfer portion which opposes to the back surface of the light guide portion and is provided with an interval which is a wavelength of the light or more being spaced from the back surface; and a support portion which is in contact with part of the concave portion and provided between the reflecting portion and the heat transfer portion, and which keeps the interval between the light guide portion and the heat transfer portion.

10. The light bulb according to claim 9, wherein the light guide portion guides the light between the emission surface and the back surface, and an angle formed between a direction in which the light guide portion guides the light and a normal direction which is vertical to a lateral surface of the concave portion is greater than a critical angle of total reflection.

11. The light bulb according to claim 9, further comprising a plurality of reflecting portions, wherein a number of the reflecting portions per unit area in the back surface of the light guide portion increases apart from the light source.

12. The light bulb according to claim 9, further comprising a bonding portion on which the light source is set, which connects the heat transfer portion and which has higher thermal conductivity than thermal conductivity of the light guide portion.

13. The light bulb according to claim 9, further comprising a first through-hole which penetrates the light guide portion, wherein an angle formed between a direction in which the light guide portion guides the light and a normal direction which is vertical to a lateral surface of the first through-hole is greater than a critical angle of total reflection.

14. The light bulb according to claim 9, further comprising a plurality of first through-holes, wherein, apart from the light source, an angle formed between a direction in which the light guide portion guides the light and a normal direction which is vertical to a lateral surface of the first through-hole becomes close to a critical angle of total reflection and a number of the first through-holes per unit area increases.

15. The light bulb according to claim 9, further comprising a through-hole which penetrates the heat transfer portion.

* * * * *